UNITED STATES PATENT OFFICE.

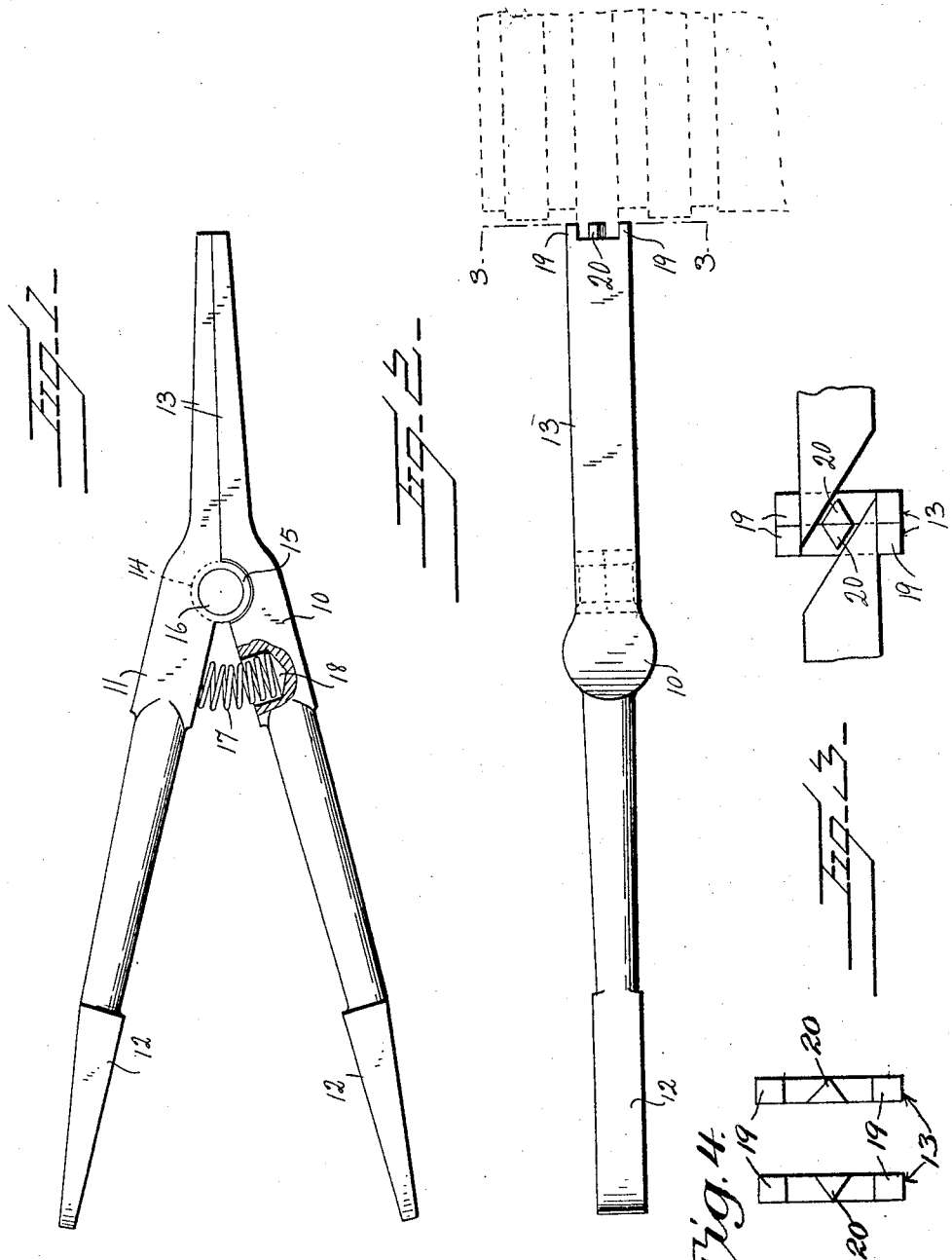

CLARENCE D. LANDAW, OF PORTLAND, OREGON.

PISTON-RING REMOVER.

1,324,557.  Specification of Letters Patent.  Patented Dec. 9, 1919.

Application filed August 14, 1918. Serial No. 249,875.

*To all whom it may concern:*

Be it known that I, CLARENCE D. LANDAW, a citizen of the United States, residing at Portland, in the county of Multnomah and State of Oregon, have invented certain new and useful Improvements in Piston-Ring Removers, of which the following is a specification, reference being had to the accompanying drawings.

This invention relates to devices for removing piston rings and the general object of the invention is to provide a very simple and effective device of this character which is so constructed that it may be inserted between the extremities of the piston ring when the latter is in place within a piston ring groove for the purpose of expanding the ring and disengaging it from the piston.

A further object is to provide a device of this character which will wedge the piston ring open, which wedging action will lock the piston ring to the remover so the piston ring may be pulled off.

Other objects will appear in the course of the following description.

In the accompanying drawings:

Figure 1 is a side elevation of the ring remover partly broken away;

Fig. 2 is a top plan view showing in dotted lines a portion of the piston and a ring being removed; and Fig. 3 is an inside face view of part of a piston ring taken on the line 3—3 of Fig. 2 and showing the end of my appliance.

Fig. 4 is a face view of the extremities of the ring remover jaws in opened position.

Referring to these figures it will be seen that my device comprises two members 10 and 11 which are substantially similar in form and construction, each of these members being somewhat angular in form to provide handles 12 which may be readily grasped and provide flat, somewhat tapering jaws 13. The member 10 is provided with the hinge lug 14 and the member 11 with a pair of hinge lugs 15 embracing the hinge lug 14 and through these hinge lugs passes the pintle 16. A compression spring 17 urges the handles 12 apart and the flat faces of the jaws 13 against each other. This spring at its ends is inserted within sockets 18 drilled in the handles 12 adjacent the point of pivotal connection.

The extremity of each jaw 13 is formed as illustrated in Fig. 2 with the laterally disposed teeth or lugs 19 and the medially disposed tooth or lug 20. This lug 20 is not as deep as the lugs 19 and is triangular in form, the base of the triangle being flush with the inner face of the jaw. The lugs 19 and the lug 20 on one jaw lie flat against the corresponding lugs of the opposite jaw. The distance between the lugs 19 is equal to the width of the piston ring while the combined thickness of the two lugs 20 is somewhat less than the distance between the ends of the piston ring, when the latter is in applied position.

When it is desired to remove a piston ring, the extremities of the jaws 13 are disposed with the lugs 20 between the ends of the piston ring with the opposite or beveled faces of the lug bearing against the beveled end faces of the ring. This is easily accomplished by placing the piston and connecting rod in a bench vise, gripping the connecting rod just below the skirt of the piston. The forefinger of the right hand is placed on the piston ring to be removed at a point just opposite the cut or slit in the piston ring and this portion of the piston ring is forced into the groove thus forcing the opposite portion of the piston ring outward. Then the lugs 20 are inserted as before described and the handles 12 pressed against each other. If the piston ring has beveled parallel ends, the movement of the lugs 20 away from each other will cause the piston ring to expand and bind against one or the other of the lugs 19 on the corresponding jaw. When the ring has been expanded to the proper amount the ring is lifted up by means of this implement and detached entirely from the piston.

While I have illustrated a remover having lugs 19 and 20 which are particularly designed for the purpose of engaging and removing piston rings having inclined end faces it will be obvious that the removing device may also be used for piston rings having end faces of other forms, as the form of the lugs 20 may have to be changed to suit the shape of the end edges of the piston rings.

It will be noted that with the construction illustrated, the beveled ends of the piston rings are supported between the beveled faces of the lug 20 and the inner face of the lug 19 and that the resilience of the piston ring tends to wedge the beveled ends into the spaces between the lugs 20 and the lugs 19 so that the piston ring may be lifted up from the piston or disposed thereon and the piston ring will not drop from the remover. Furthermore, because of the use of lugs 20 which are triangular in form, the implement does not have to be turned or disposed in one particular position with reference to the slot in the piston ring before its engagement with the piston ring, but either of the pairs of lugs 19 may be disposed above or below the piston ring, thus making the implement very handy to use.

What I claim is:

A piston ring remover comprising a pair of jaws having flat confronting faces and a pair of handles extending at an angle to the jaws, the jaws being pivoted to each other, the extremities of the jaws being relatively thin and being formed to provide on each jaw a pair of laterally disposed lugs spaced from each other a distance slightly greater than the width of the piston ring and a medially disposed lug approximately triangular in cross section, the medial lug of one jaw normally bearing against the medial lug of the opposite jaw, and a spring bearing against the handles and urging the jaws across each other.

In testimony whereof I hereunto affix my signature in the presence of two witnesses.

CLARENCE D. LANDAW.

Witnesses:
H. T. HART,
C. L. STARR.